United States Patent [19]
Downing et al.

[11] 3,710,644
[45] Jan. 16, 1973

[54] CONTROL SETTING APPARATUS

[75] Inventors: James W. Downing, Buena Park; Charles V. Harris, Cerritos, both of Calif.

[73] Assignee: McDonnell Douglas Corporation

[22] Filed: July 29, 1971

[21] Appl. No.: 167,191

[52] U.S. Cl. ...................74/526, 74/491, 74/533
[51] Int. Cl. ................................................G05g 1/04
[58] Field of Search.........74/526, 527, 528, 533, 491

[56] References Cited

UNITED STATES PATENTS 1,176,077   3/1916   Melton ..............................74/525

Primary Examiner—Milton Kaufman
Attorney—Walter J. Jason et al.

[57] ABSTRACT

A rotatable detent moved to a preselected position provides a stop for the positioning of flap-slat control handles. A latch pin on the handle fits into the detent when the handle has been moved to this position of alignment. A thumb wheel is used to rotate a worm drive for moving the detent to an infinite number of positions. Additional gearing is provided to rotate an indicator so that the exact position of the detent, and the flap-slat positions, may be readily and easily determined.

8 Claims, 2 Drawing Figures

PATENTED JAN 16 1973

3,710,644

INVENTORS
JAMES W. DOWNING
CHARLES V. HARRIS
BY Robert O. Richardson
ATTORNEY

CONTROL SETTING APPARATUS

BACKGROUND OF THE INVENTION

The competitive advantages that sell commercial transport aircraft are usually related to performance gain, resulting in greater safety or economics, or both. A gain in performance that will permit a greater take-off weight by the addition of a larger payload is one such gain. The optimization of take-off flap settings which would result in a 1° increment of position instead of a 2° increment can result in a 1 percent gain in take-off weight. Thus, on a 500,000 pound gross weight airplane, an additional payload of 5,000 pounds can be added with safety. Two-tenths of a degree increments in flap setting might offer a performance penalty of up to 1,000 pounds. Complete elimination of performance penalties would require infinite position ability of take-off flaps.

Formerly, before take-off, the flaps were run down or lowered by means of an electric or hydraulic actuator until a control dial pointer reached a desired flap setting. This required constant observance of the dial while the flaps were being lowered. Current airplanes now in service are limited to a small number of take-off settings by the practical requirement of having a minimum number of handle latching detents in the take-off flap range to avoid pilot error and to eliminate small delicate parts. A present requirement, however, is that a flap setting must be preselected and another requirement is that the handle position must indicate the flap position. In addition to the preselection of the flap position in which the handle position indicates the flap position, the flap setting apparatus should be infinitely adjustable in order to obtain maximum take-off under all possible operating conditions. The preselection of flap positions may be set into the apparatus by a vernier adjustment provided adjacent the handles. Thus, a pilot, boarding the airplane prior to departure with last minute updated information, can preset the vernier before taxiing out for take-off. In the take-off position, a standard flap handle operation sets flaps at the previously selected optimum position.

As presently configured the device provides for take-off performance optimization but, if appropriate, it is adaptable to landing flap setting also.

SUMMARY

Aircraft take-off flap positions and go-around flap gate positions are provided with flap control setting apparatus of the present invention which has sufficient flexibility to achieve maximum take-off under all possible operating conditions. A rotatable vernier flap detent for receiving the flap-slat handle is manually cranked into position to stop the handle, and thus the flaps, at the desired deflection for the pending aircraft maneuver such as take-off or go-around. A latch pin on the handle engages the detent to limit further handle movement and thus preposition the controls. The crank includes a thumb wheel rotated to operate a worm gear sector which rotates the detent along the arc of rotation of the handle to establish the desired deflection position. Additional gearing turns an indicator wheel to provide for a readout of the position selected.

DETAILED DESCRIPTION OF THE DRAWINGS

Figure 1:
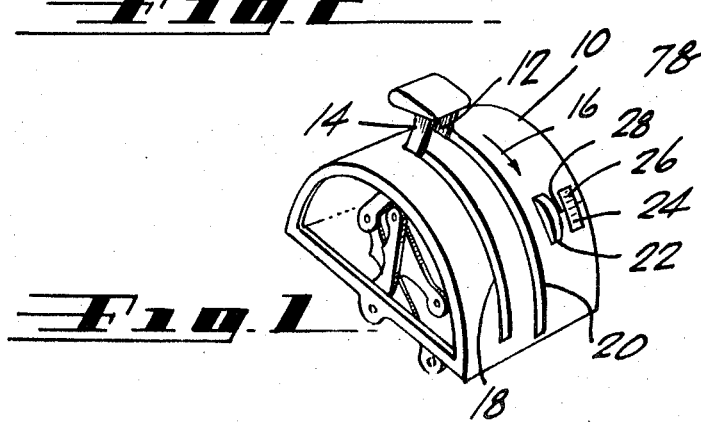
FIG. 1 is a perspective view of a portion of the control pedestal wherein the present invention is used.

Reference is now made to FIG. 1 wherein is shown a pedestal 10 in which a slat handle 12 and flap handle 14 are mounted for rotation from their flap and slat retraction position, as shown, to a rearward position in the direction of arrow 16 for extending the flaps and slats a predetermined amount. Slots 18 and 20 in the pedestal 10 provide guides for this purpose. Also on the pedestal, and extending above the surface, is a thumb wheel 22, and an indicator 24 having indicia 26 thereon which may be moved by manipulation of the thumb wheel 22 past an indicia mark 28 on the pedestal 10. The positioning of certain indicia 26 to the indicia mark 28 is controlled by the thumb wheel 22 and indicates the position of a latching detent, not shown, and positioned within the pedestal 10 for determining the latched position of the flap handle 14 and slat handle 12 when the operator moves them rearwardly.

Figure 2:
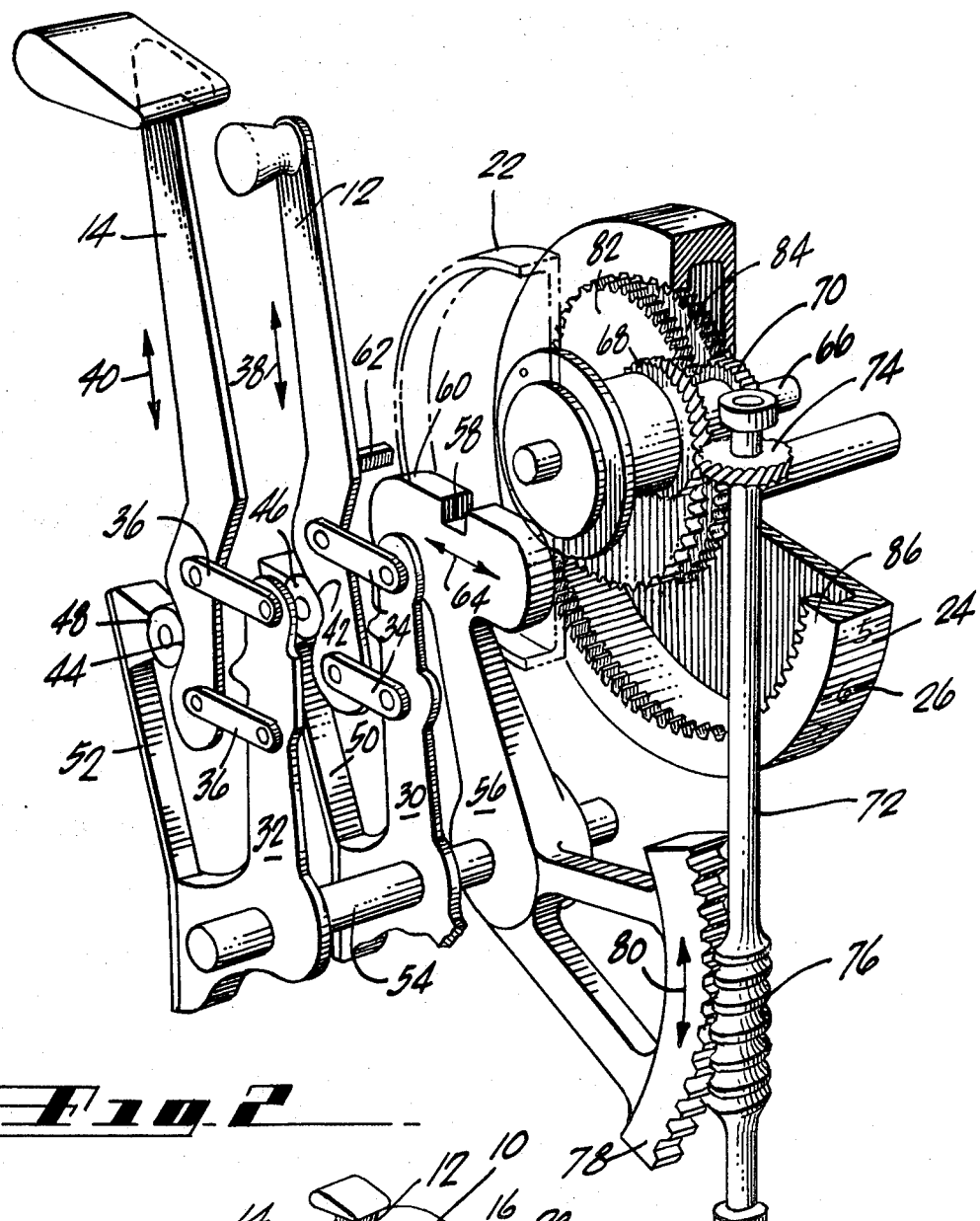
FIG. 2 is a perspective view illustrating the structure within the pedestal showing one form of the present invention.

Referring now to FIG. 2, there is shown slat handle 12, flap handle 14, thumb wheel 22 and indicator 24 which was shown in FIG. 1. Handles 12 and 14 are pivotally connected to handle support assemblies 30 and 32 through links 34 and 36 so that they may be vertically movable as shown by the arrows 38, 40. These handles have recesses 42, 44 therein against which rollers 46, 48 are urged by springs 50, 52 to maintain them in a vertically neutral position. The handle support assemblies 30 and 32 rotate on a pivotal axis 54 which is mounted to a pedestal frame, not shown. These handles are of the type and perform in the manner more clearly set forth in co-pending patent application for Slat Retract Gate by Carlos P. Fernandez, Ser. No. 159,722, filed July 6, 1971, and assigned to the same assignee as that of this case.

Also pivotally mounted on axis 54 is a movable detent member 56 having a detent 58 in the top surface 60. Handle 12 has a laterally extending latch pin 62 adapted to pass over the surface 60 and fit within detent 58 when handle 12 is manually rotated. The position of detent 58 is determined by the rotation of detent member 56 movable as shown by the arrow 64. This movement is accomplished by the manual rotation of thumb wheel 22.

Thumb wheel 22, when rotated, rotates a hub 66 on which is mounted a helical output gear 68 and an indicator input gear 70. A worm shaft 72 has a helical gear 74 cooperatively engageable with the helical output gear 68 to serve as the worm shaft input and to cause rotation thereof. At the lower end of the worm shaft 72 is a worm drive 76. A worm wheel sector 78 is mounted on axis 54 as an integral part of detent member 56 so that movement of the worm wheel sector, as shown by arrow 80, will cause movement of detent 58, as shown by arrow 64. Worm drive 76, upon rotation, actuates the worm wheel sector 78.

The indicator input gear 70 drives an input idler gear 82 which, in turn, drives an idler output gear 84. This gear mates with and drives an indicator ring gear 86 to cause rotation of the indicator wheel 24. As previously mentioned, the indicia 26 on the outer surface of the indicator 24 indicates to the operator the position of the detent 58. Having preset this preselected position, the operator then merely has to move rearwardly latch handle 12 (or handle 14 operatively connected thereto) and latch pin 62 will drop into detent 58 to automatically position the slats and flaps for the desired aircraft maneuver. The simplicity of this operation and the subsequent reduction in pilot workload provides an additional safety factor that cannot be overlooked, although the principle advantage is in the ability to add payload to the aircraft when take-off conditions are critical.

Having thus described an illustrative form of one embodiment utilizing the present invention, it is to be understood that other forms will become apparent to those skilled in the art and it is to be understood that these deviations are to be considered as part of the present invention as set forth in the appended claims.

We claim:

1. A control setting apparatus comprising a control handle pivotally mounted on an axis, a detent member having a detent therein, said detent member being pivotally mounted on said control handle axis, said handle having a latch pin engageable with said detent upon rotation of said handle for alignment therewith, and means for selectively positioning said detent member along the arc of rotation of said handle.

2. A control setting apparatus as in claim 1, wherein said means for selectively positioning said detent includes crank means for rotating said detent member to preselected positions.

3. A control setting apparatus as in claim 2 wherein said crank means includes a thumb wheel rotatably operable to rotate a worm shaft with a worm drive thereon, said detent member having a worm wheel sector engageable with and driven by said worm drive for rotatively positioning said detent.

4. A control setting apparatus as in claim 3 wherein said thumb wheel is interconnected with and rotates said worm shaft through helical gears.

5. A control setting apparatus as in claim 2 wherein said crank means also operates an indicia means for indicating the position of said detent member.

6. A control setting apparatus as in claim 5 wherein said indicia means includes a rotatable indicator wheel with indicia markings thereon, said indicator wheel being operatively connected to said thumb wheel through an input gear connected to said thumb wheel, an indicator ring gear on said indicator wheel, and idler gears therebetween.

7. A control setting apparatus as in claim 1 wherein said control handle is an aircraft slat actuation handle for setting slats at selected extended positions in accordance with desired aircraft maneuvers under predetermined flight conditions.

8. A control setting apparatus as in claim 1 wherein said handle is spring biased in a radially extendible neutral position to urge said latch pin into said detent when in alignment therewith.

* * * * *